United States Patent [19]
Haartsen et al.

[11] Patent Number: 6,091,954
[45] Date of Patent: *Jul. 18, 2000

[54] CHANNEL ASSIGNMENT IN ENHANCED FIXED-PLAN MOBILE COMMUNICATIONS SYSTEMS

[75] Inventors: Jacobus C. Haartsen, Staffanstorp, Sweden; Paul W. Dent, Pittsboro, N.C.

[73] Assignee: Telefonaktiebolaget LM Ericsson, Stockholm, Sweden

[*] Notice: This patent is subject to a terminal disclaimer.

[21] Appl. No.: 08/831,536

[22] Filed: Apr. 7, 1997

Related U.S. Application Data

[63] Continuation-in-part of application No. 08/299,420, Sep. 1, 1994, Pat. No. 5,666,649.

[51] Int. Cl.[7] ...................................................... H04B 7/26
[52] U.S. Cl. ............................ 455/447; 455/450; 455/62; 455/525
[58] Field of Search ................................ 455/62, 63, 435, 455/447, 448, 450, 451, 525, 509, 513, 436, 437, 438, 439

[56] References Cited

U.S. PATENT DOCUMENTS

| | | |
|---|---|---|
| 4,144,411 | 3/1979 | Frenkiel . |
| 4,989,230 | 1/1991 | Gillig et al. . |
| 5,014,342 | 5/1991 | Pudsey . |
| 5,038,399 | 8/1991 | Bruckert . |
| 5,127,042 | 6/1992 | Gillig et al. . |
| 5,212,684 | 5/1993 | MacNamee et al. . |
| 5,247,699 | 9/1993 | Hartman . |
| 5,251,249 | 10/1993 | Allen et al. . |
| 5,257,398 | 10/1993 | Schaeffer . |
| 5,280,630 | 1/1994 | Wang . |
| 5,313,653 | 5/1994 | Sasuta . |
| 5,386,589 | 1/1995 | Kanai . |
| 5,392,458 | 2/1995 | Sasuta et al. . |
| 5,412,375 | 5/1995 | Wood . |
| 5,428,815 | 6/1995 | Grube . |
| 5,471,645 | 11/1995 | Felix . |
| 5,483,666 | 1/1996 | Yamada et al. . |
| 5,504,939 | 4/1996 | Mayrand et al. . |
| 5,561,843 | 10/1996 | Tsang et al. . |

FOREIGN PATENT DOCUMENTS

| | | |
|---|---|---|
| 0 522 276 A2 | 1/1993 | European Pat. Off. . |
| 0 680 159 A2 | 11/1995 | European Pat. Off. . |
| WO 90/04293 | 4/1990 | WIPO . |
| WO 92/20197 | 11/1992 | WIPO . |
| WO 94/01956 | 1/1994 | WIPO . |
| WO 94/05130 | 3/1994 | WIPO . |
| WO 94/08434 | 4/1994 | WIPO . |
| WO 96/07288 | 3/1996 | WIPO . |

OTHER PUBLICATIONS

Samuel W. Halpern, "Reuse Partitioning In Cellular Systems", Bell Laboratories, West Long Beach, NJ 07764, pp. 322–327.

R. Mertens and Dr. Nils Mäthner, "Mobilfunk Für Verkehrstelematik" *Elektronik*, pp. 50–53, & pp. 58 and 60, 43(1994) Aug. 23, No. 17, Poing, Germany.

Patent Abstracts of Japan, vol. 18, No. 99, (E–1510), published on Feb. 17, 1994, corresponding to Japanese Patent Publication No. JP5300072 (published Nov. 12, 1993).

*Primary Examiner*—Reinhard J. Eisenzopf
*Assistant Examiner*—Lester G. Kincaid
*Attorney, Agent, or Firm*—Burns, Doane, Swecker & Mathis, L.L.P.

[57] ABSTRACT

In a multi-reuse level cellular communications system, a channel is assigned for use by a mobile unit by first determining whether the mobile unit is a non-enhanced mobile unit or an enhanced mobile unit. Then a determination is made as to the type of communication service being requested. A minimum link quality required by the mobile unit can then be established based on factors that include the mobile unit type and the type of communication service being requested. A base station that has the necessary receiver detection capabilities and transceiver processing capabilities is then selected, and a channel, corresponding to a highest reuse plan, available to the base station is assigned to the call.

38 Claims, 3 Drawing Sheets

CHANNEL ASSIGNMENT IN ENHANCED FIXED-PLAN MOBILE COMMUNICATIONS SYSTEMS

CROSS REFERENCE TO RELATED APPLICATION

This is a Continuation-in-Part of Application Ser. No. 08/299,420, now U.S. Pat. 5,666,649 filed Sep. 1, 1994.

BACKGROUND

The present invention relates to frequency reuse in a mobile communications system, and more particularly to assigning a channel, associated with one of a number of fixed reuse plans, to a mobile call as a function of the mobile unit type, the communication data service being requested by the mobile unit, and base station receiver detection and transceiver processing capabilities.

It is known that the frequency reuse plans of a cellular communications system affect both the Carrier-to-Interference (C/I) immunity and the traffic-carrying capacity of the system. For example, a high frequency reuse plan (i.e., a plan that employs shorter reuse distances) will improve the traffic-carrying capacity of the system; however, it will also result in a degradation in the C/I performance. In contrast, C/I performance can be improved by utilizing a lower frequency reuse plan (i.e., a plan that employs longer reuse distances), but this improvement is achieved at the expense of the traffic-carrying capacity of the system.

In addition, downlink performance for one mobile unit versus another, for a given link quality (e.g., a C/I condition), is not necessarily uniform. That is because downlink performance varies as a function of the mobile unit type, that is, the type of technology employed by each mobile unit. For example, there are now mobile units that employ enhanced receiver detection features such as receiver diversity and interference cancellation techniques. These mobile units are referred to hereinbelow as "enhanced" mobile units. These enhancements permit the mobile unit to adequately function even if the downlink is operating at lower than normal link quality conditions. Consequently, enhanced mobile units may be capable of receiving information over channels that are allocated to a high frequency reuse plan.

To employ a high reuse plan and to increase the traffic-carrying capacity of the system, the base station connected to the mobile unit must also be capable of operating at the same lower than normal link quality condition. This can be accomplished by providing similar receiver detection enhancements at the base station (e.g., receiver diversity and interference cancellation techniques). However, until all mobile units employ these enhancements, mobile communications systems must continue to support conventional mobile units (i.e., mobile units that do not possess any of the aforementioned receiver detection enhancements), which cannot adequately operate at lower than normal link quality conditions. The problem, of course, is that if a system operates at higher link quality conditions to satisfy the requirements of conventional mobile units, it cannot take advantage of the enhanced mobile units and increase the traffic-carrying capacity.

Furthermore, mobile units are utilized for more than simply low bit rate voice communication. For example, mobile units are often used for high bit rate data transmission. Compared to low bit rate voice communication, high bit rate data transmission is more susceptible to interference. The degree to which the transmission is susceptible may depend upon the presence or absence of various processing enhancements such as error correction techniques (e.g., forward error correction coding) and multi-level modulation techniques. While more extensive error correction techniques tend to reduce the susceptibility of the link to interference, the error correcting codes employed to implement the error correction take up precious bandwidth. Consequently, error correction coding is often minimized so that a greater percentage of the bandwidth can be dedicated to data transmission. In any event, to support high bit rate data services, a system may be forced to operate at higher than normal link quality conditions.

A number of documents describe techniques for overlaying multiple reuse patterns within a given geographical area. For example, U.S. Pat. No. 4,144,411 to Frenkiel discloses a cell splitting technique in which there is static reuse of frequencies in a large-cell type reuse pattern to a miniature-sized overlaid, but same type reuse pattern. An article by Samuel W. Halpern entitled "Reuse Partitioning in Cellular Systems", presented at the 33rd IEEE Vehicular Technology Conference on May 25–27, 1983 in Toronto, Ontario, Canada describes a cellular system having multiple reuse levels within a given geographical area whereby, for example, a cluster of cells normally employing a seven-cell reuse pattern may simultaneously operate on a three-cell reuse pattern. In this scheme, one set of frequencies is dedicated to the three-cell reuse pattern while another set of frequencies is dedicated to either a seven-cell or a nine-cell reuse pattern. By allocating frequencies from both sets for use in a particular cell, one cell site may operate on either reuse pattern.

As a variation on the static reuse schemes described in the Frenkiel and Halpern documents, U.S. Pat. No. 5,257,398 to Schaeffer describes a system employing dynamic multiple reuse levels. In this scheme, carriers are allocated according to one reuse pattern during one time interval, and allocated according to another reuse pattern during another time interval.

U.S. Pat. No. 5,038,399 to Bruckert describes a method for assigning channel reuse levels in any of the aforementioned multi-reuse level cellular systems.

Although the above mentioned documents describe techniques for establishing and utilizing multiple reuse plans in a single geographical area, each makes a channel or reuse plan assignment based on measurements of existing C/I conditions at the time the assignment is to be made. In effect, these techniques treat all mobile units as having equivalent performance characteristics for any given C/I condition. Moreover, they ignore the fact that a mobile unit may request one of a number of different communication services, each of which may have a distinctly different effect on minimum required link quality. Therefore, these conventional techniques ignore any possible traffic-carrying capacity gains that could be achieved by considering the mobile unit type, the base station capabilities, and the type of communication service being requested by the mobile unit.

U.S. Pat. No. 5,666,649 discloses one approach to improving system performance when a mixture of enhanced and non-enhanced mobile units are present in a communications system. In particular, Dent discloses detecting whether the mobile unit has a particular capability to receive signals at a lower signal-to-interference ratio, and operating the base station to improve system performance in response to detection that the mobile unit has the particular capability. As described by Dent, improving performance includes reducing the consumption of spectral resources such as, for example, by adjusting the power level of the frequency channel to reflect the minimum required link quality (i.e., C/I condition) of the mobile unit, thus permitting the system to increase the traffic-carrying capacity by increasing the reuse of the frequency channel. U.S. patent application Ser. No. 08/299,420 is incorporated herein by reference.

There is, therefore, a need for a communications system that is suitable for use by non-enhanced mobile units, which also takes into account the presence of enhanced mobile units that employ one or more of the above-identified feature enhancements, the capabilities and limitations of the base station, and the communication services being requested by the mobile unit, when assigning a channel associated with one of a number of fixed reuse plans, so as to increase the system's traffic-carrying capacity.

SUMMARY

In accordance with one aspect of the present invention, the foregoing and other objects are achieved by an apparatus and/or method for assigning a channel to a mobile call that involves determining a minimum link quality for the mobile call; selecting a base station that has the receiver detection characteristics that enable the base station to operate at the minimum required link quality; and assigning a channel associated with the base station to the mobile call.

In accordance with still another aspect of the present invention, the foregoing and other objects are achieved by an apparatus and/or method for assigning a channel to a mobile call, which involves determining a minimum link quality required for the mobile call; selecting one of a plurality of base station transceivers associated with a base station, wherein each of the transceivers corresponds to a different fixed reuse plan, and wherein the selected one of said plurality of base station transceivers comprises receiver detection characteristics that enable the base station to operate at the minimum required link quality; and assigning a channel to the mobile call, wherein the channel is associated with the fixed reuse plan that corresponds with the selected transceiver.

In accordance with another aspect of the present invention, the foregoing and other objects are achieved by an apparatus and/or method for assigning a channel, associated with one of a number of fixed reuse plans, to a mobile unit which involves determining a communication data service being requested by the mobile unit; selecting a base station that is capable of processing the requested communication data service; determining a mobile unit type; determining a minimum required link quality for the mobile unit; selecting one of a plurality of fixed reuse plans, wherein the selected reuse plan assures at least said minimum required link quality; and assigning a channel, allocated to the base station, and associated with the selected fixed reuse plan that at least assures the minimum required link quality.

In accordance with yet another aspect of the present invention, the foregoing and other objects are achieved by an apparatus and/or method for assigning a channel, associated with one of a number of different fixed reuse plans, to a mobile unit, which involves determining a communication service being requested by the mobile unit; determining a mobile unit type; determining a minimum required link quality for the mobile unit based upon the requested communication service and the mobile unit type; selecting a base station that has the capability to support the requested communication service, and is known to have an available channel associated with a fixed reuse plan that at least assures the minimum required link quality; and assigning the available channel.

BRIEF DESCRIPTION OF THE DRAWINGS

The objects and advantages of the invention will be understood by reading the following detailed description in conjunction with the drawings in which.

DETAILED DESCRIPTION

Figure 1:
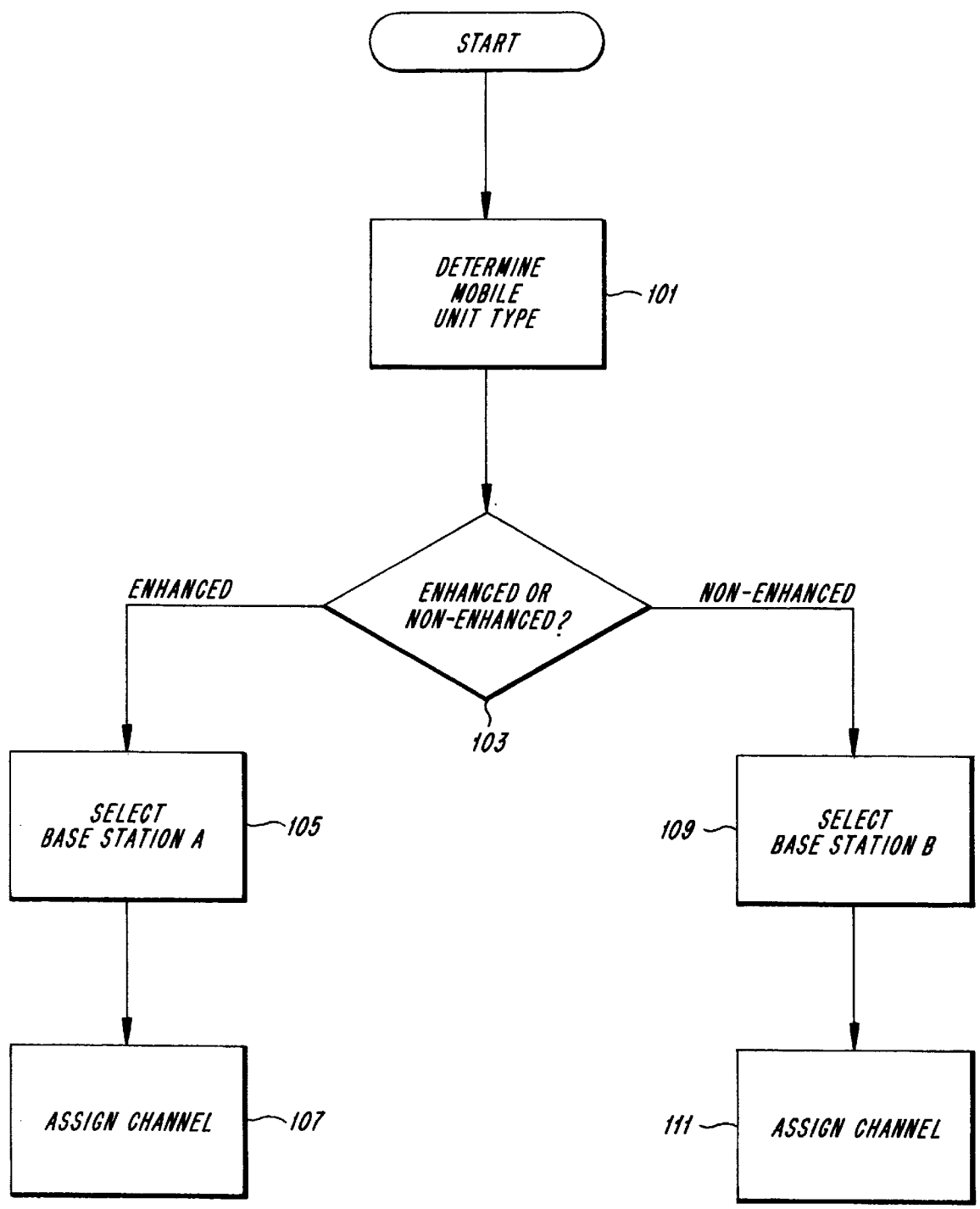
FIG. 1 is a flow chart depicting a technique for selecting a base station and assigning a channel for use by a mobile unit in accordance with one aspect of the invention.

The various features of the invention will now be described with respect to the figures, in which like parts are identified with the same reference characters.

This invention recognizes that, at present, there will be a mix of both enhanced mobile units and conventional (i.e., non-enhanced) mobile units operating in a cellular communications system. In addition, the invention recognizes that a mobile unit, whether or not it is enhanced or conventional, may request any number of different communication services. For example, these services may include low bit rate voice services, high bit rate data services, low or high bit rate services with or without varying degrees of forward error correction coding, or high bit rate data services with multi-level modulation. Finally, the invention recognizes that in order to determine a minimum link quality requirement for a mobile call, with the intent that the minimum link quality is to be used for establishing a preferred reuse plan, consideration should be given to the type of service being requested by the mobile unit, the type of mobile unit placing the call, whether the base station has the capability to operate at the minimum required link quality, and whether the base station has the capability to process the requested communication service.

In accordance with one aspect of the invention, a multiple fixed reuse plan is imposed on a given geographical area: a first reuse plan associated with a "normal" reuse distance which supports the minimum link quality requirements of conventional mobile units, one or more higher reuse plans associated with lower than normal reuse distances which support the minimum link quality requirements of various enhanced mobile units, and one or more lower reuse plans associated with higher than normal reuse distances, which typically support mobile units requesting high bit rate data services, as will be discussed in greater detail below. One way to accomplish this multiple fixed reuse plan is to provide two or more base stations covering the geographic area, wherein each base station is associated with a different reuse plan. More specifically, each base station comprises a different set of hardware and/or software components, thus, each base station is capable of operating at a different uplink quality level. The frequency channels allocated to the geographic area are then divided among each base station.

Thus, when a mobile unit first places a call from within the geographic area, the network selects a base station that has the receiver detection capability needed to adequately operate with an uplink quality level that is at least equivalent to the minimum downlink quality required by the mobile unit. By selecting a base station that is capable of operating at the same minimum link quality as the mobile unit, the communication link or connection is said to be balanced.

For example, a geographic area (e.g., a macro cell) may contain two base stations: base station A and base station B. In this example, base station A includes one or more receiver detection capabilities that allow it to adequately operate when the uplink exhibits the same minimum link quality that is required in the downlink by an enhanced mobile unit. These receiver detection capabilities may include various receiver diversity techniques as well as interference cancellation techniques, which are well-known in the art. In contrast, base station B does not include these capabilities. Nevertheless, base station B is capable of adequately operating when the uplink exhibits the same minimum link quality that is required in the downlink by a conventional mobile unit.

A technique for assigning a channel associated with either base station A or base station B for use by any given mobile unit will now be described with reference to the flowchart depicted in FIG. 1.

First, the mobile unit requesting service is tested to determine its type (step 101). This may occur, for example, when a call is first established by the mobile unit. If the mobile unit is an enhanced unit (step 103), the network determines which of the base stations is, by nature of its detection capabilities, best suited to handle the call. In this example, base station A will be selected (step 105). A channel from a set of channels associated with base station A is then assigned to the mobile call in accordance with any number of conventional, well known channel allocation procedures (step 107), such as random selection of an idle channel, selection of the least interfered channel, or selection based on link quality (e.g., C/I) as compared to a pre-determined threshold.

If, however, the mobile unit is a non-enhanced unit (step 103), the network will, in this example, select base station B (step 109) because base station B will adequately operate when the uplink exhibits the same link quality as required in the downlink by a conventional mobile unit. A channel from the set of channels associated with base station B is then assigned to the call in accordance with conventional channel allocation procedures (step 111). In each case, the selected base station, along with its corresponding set of channels, is associated with the fixed reuse plan that coincides with the minimum required link quality. Therefore, in each case, the traffic-carrying capacity of the system is efficiently utilized.

In an alternative embodiment, a channel associated with base station B may be assigned to a mobile call placed by an enhanced mobile unit, if a channel associated with base station A (i.e., the preferred base station) is unavailable. This, of course, is possible because base station B is associated with a lower reuse plan (i.e., a reuse plan that employs a greater reuse distance and a link quality that actually exceeds the minimum link quality required by an enhanced mobile unit).

In yet another alternative embodiment, there may be only a single base station covering a geographic area. In accordance with this embodiment, a base station may employ two or more base station transceivers. Although the transceivers may, to some extent, share the same hardware, each transceiver will possess different receiver detection characteristics, as did the two or more base stations described above, such that each transceiver is associated with a different fixed reuse plan and its own set of pre-allocated channels to support the corresponding reuse plan. When a call is first placed with a given base station, the network will determine the type of mobile unit placing the call, that is, whether the mobile unit is an enhanced unit (i.e., possesses any receiver detection enhancements), or whether the mobile unit is a non-enhanced unit. The network will then select the base station transceiver that possesses comparable receiver detection capabilities in order to provide a balanced connection. Once the appropriate transceiver is selected, an available channel, from among the set of channels pre-allocated to the selected transceiver will be assigned to the call, in accordance with conventional channel selection techniques.

In each of the embodiments described above, it is presumed that the mobile units are involved with only one type of communication service, such as low bit rate voice. Consequently, the selection of a preferred base station, or base station transceiver, and a corresponding channel for the mobile call primarily depends upon the mobile unit type and whether the base station has the receiver detection capabilities needed to operate with an uplink quality that is the same as the minimum link quality required in the downlink by the mobile unit.

Mobile units today, however, are typically capable of requesting communication services other than low bit rate voice. For example, a mobile unit may request a high bit rate data service that involves the transmission of video, fax and/or control data. The mobile unit may also request a high or low bit rate service that involves varying degrees of forward error correction coding or multi-level modulation techniques. However, each of these communication service types exhibit different levels of sensitivity to interference. Therefore, the type of communication service being requested will affect the minimum link quality required and, ultimately, the reuse plan and channel selection.

In view of this, another aspect of the invention selects, for a given mobile call, a base station and a corresponding channel for the purpose of utilizing a preferred reuse plan in a multiple fixed reuse scheme based on several factors. These factors include the type of service being requested by the mobile unit, the mobile unit type, whether the candidate base station can support the requested service (i.e., whether the base station possesses the necessary transceiver processing or bearer capabilities) and, in addition, whether the candidate base station can adequately function when the uplink quality is operating at the minimum link quality required in the downlink by the mobile unit.

Figure 2:
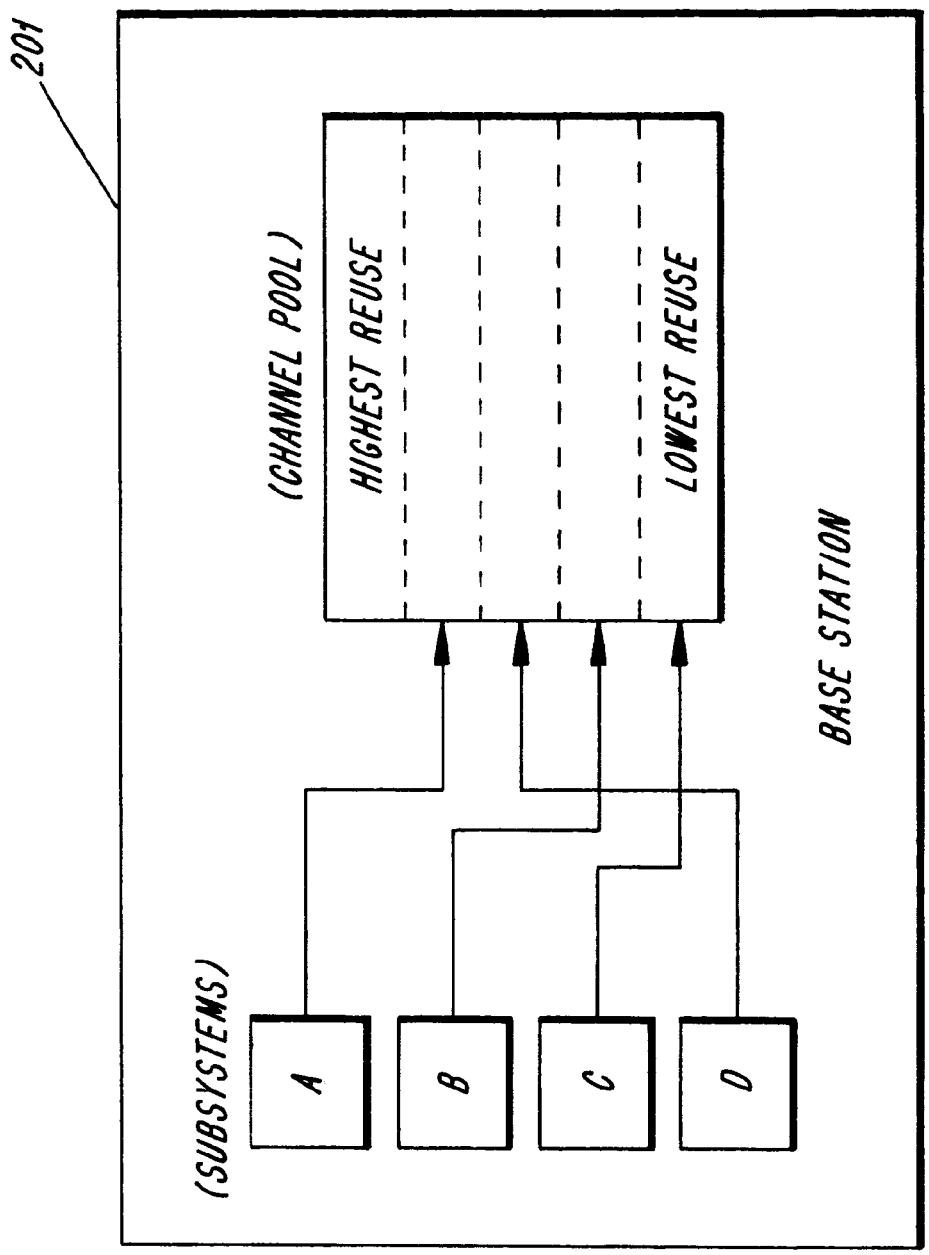
FIG. 2 is a system diagram of a base station including a number of base station subsystems in accordance with another aspect of the invention.

In accordance with this aspect of the invention, FIG. 2 depicts a system diagram of an exemplary base station. FIG. 2 shows that the exemplary base station 201 includes, for example, four subsystems: subsystem A, subsystem B, subsystem C, and subsystem D. Each subsystem is associated with a particular transceiver processing capability (i.e., bearer capability), wherein each transceiver processing capability involves a distinct set of software procedures that, when executed, provides the base station 201 with the ability to handle a particular communication service request.

For example, subsystem A may have the software procedures necessary to support high bit rate data with forward error correction coding. Subsystem B may contain the software procedures necessary to support a high bit rate data service with reduced forward error correction coding. Subsystem C may support high bit rate services without forward error correction coding and Subsystem D may support a particular high bit rate data service with multi-level modulation.

When a mobile unit first places a call from within the geographic area, the call is linked to a particular base station, for example, a macro base station. However, this base station may not possess the particular subsystem needed to process the type of service being requested. For example, the mobile unit may be requesting a high bit rate service that involves multi-level modulation, but the macro base station may not possess the capability to process this type of data service. Consequently, the network may first identify an alternative base station, such as a micro or pico base station within the geographic area, that is capable of processing the requested service, and wherein the mobile unit is within the range of the alternative base station. The network would then order the mobile unit to link to the micro or pico base station.

Once the call is linked with the appropriate base station (i.e., one that has the transceiver processing capability to handle the communication service request), the network will assign to the call, a channel associated with the highest acceptable reuse plan, i.e., the reuse plan associated with the lowest acceptable reuse distance given the minimum link quality requirements of the requested communications service and the mobile type. As shown in FIG. 2, each base station, for example base station 201, has a pool of pre-allocated channels. The pool is divided into a number of channel sets, wherein each set corresponds to a particular reuse level. For illustrative purposes, the channel set in FIG. 2 corresponding to the highest reuse plan (i.e., the reuse plan with the shortest reuse distance) is placed at the top, while the channel set corresponding to the lowest reuse plan (i.e., the reuse plan with the greatest reuse distance) is placed at the bottom. When the network needs to assign a channel to a call, the network enters the pool at the reuse plan or level that coincides with the minimum required link quality, where minimum required link quality, as stated above, depends on several factors including the type of mobile unit placing the call and the type of communication data service being requested by the mobile unit. If a channel at the preferred level or reuse plan is not available, the network will proceed to the next lower reuse plan to determine if a channel is available at that level.

Figure 3:
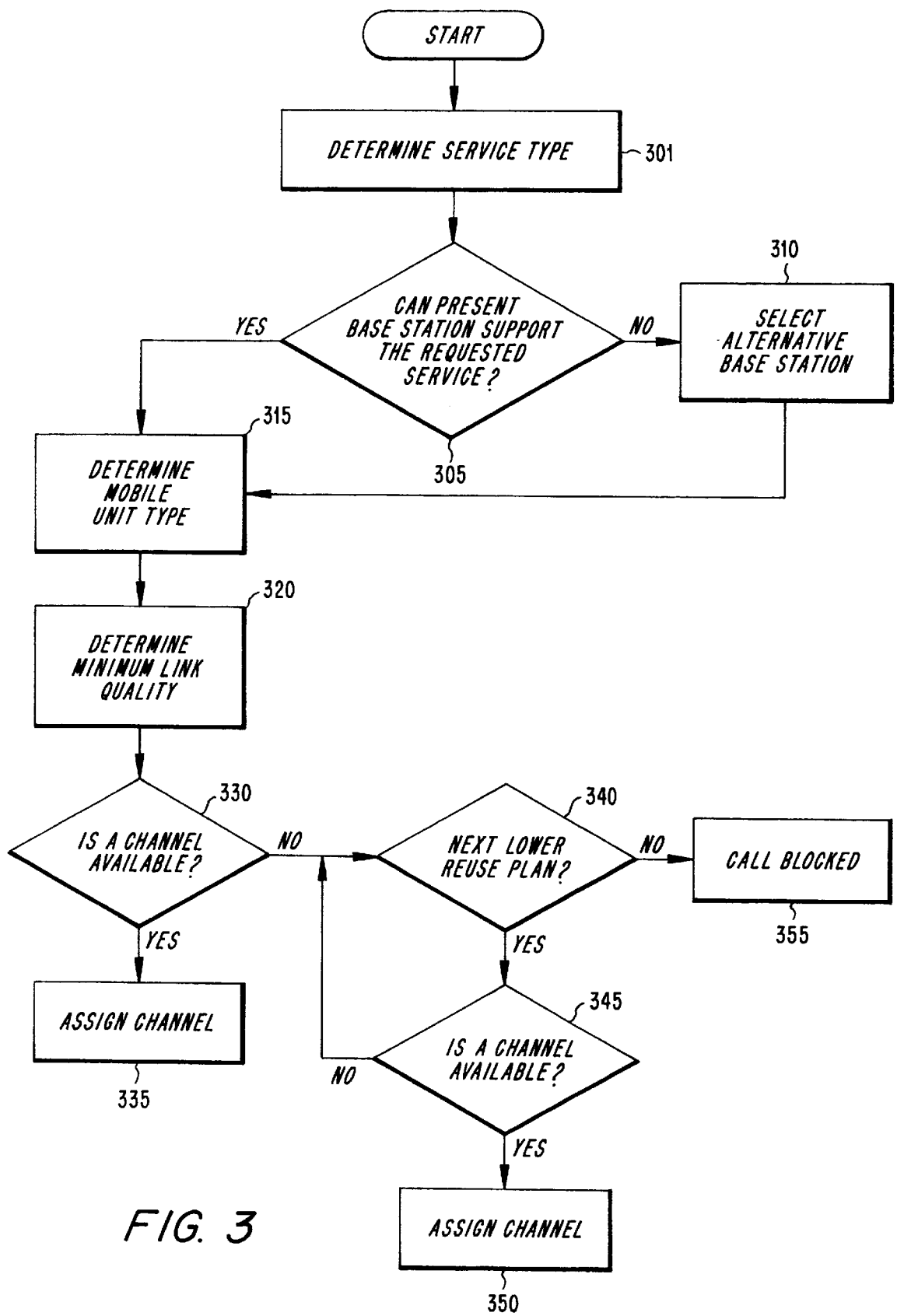
FIG. 3 is a flow chart depicting a technique for selecting a base station and assigning a channel for use by a mobile unit in accordance with another aspect of the invention.

FIG. 3 more specifically illustrates a technique for assigning a channel associated with a preferred reuse plan in accordance with this aspect of the invention. The technique begins by determining the type of service being requested by the mobile unit (step 301). For example, the mobile unit may be requesting a low bit rate voice service. As explained above, the base station with which the mobile unit is initially linked may or may not have the necessary receiver detection and/or transceiver processing capabilities to handle the call and support the requested communication service. Consequently, a determination is made as to whether the corresponding base station has the capability to support the call and the requested communication service (step 305). If it does not, the network will identify and select a different base station within the geographic area that does, in fact, possess the capability to support the call and the requested communication service (step 310), and wherein the mobile unit is within the range of the alternative base station. If the initial base station does have the necessary capabilities (step 305), or alternatively after a different base station has been selected, the mobile unit type is then determined (step 315).

Once the mobile unit type has been determined and the type of data service being requested has been determined, the minimum required link quality for the connection (i.e., both the uplink and downlink) can be established (step 320). As explained above, the required minimum link quality will depend on several factors including the mobile unit type and the communication service being requested.

Next, a test is performed to determine whether the selected base station has an available channel that is associated with the highest possible reuse plan (step 330), i.e., the reuse plan with the shortest reuse distance that can at least support the minimum link quality requirement. If one or more channels associated with this preferred, fixed reuse plan are available, then one of the channels in this reuse plan will be assigned to the mobile call in accordance with conventional channel selection techniques (step 335). If, however, a channel in this reuse plan is not available (step 330), then the next lowest reuse plan is identified (i.e., the reuse plan with the next largest reuse distance). Then a test is performed to determine if a channel associated with this next reuse plan is available (step 345). If one or more channels are available, then one of these channels will be assigned to the mobile call in accordance with conventional channel selection techniques (step 350). If no channel is available (step 345), then, once again, a next lowest reuse plan is identified (step 340). This continues until a highest possible reuse plan with an available channel is identified and selected, or until it is determined that no channels are currently available, wherein the mobile call is considered blocked (step 355). Alternatively, the network can, instead of blocking the call, determine if there is another base station in the geographical area that has the capability to handle the call and the requested communication service (step 310), and wherein the mobile unit is within the range of the alternative base station.

It will be recognized that with the above-described channel selection technique, the network always attempts to select a channel corresponding to the highest possible reuse plan (i.e., the reuse plan associated with the shortest reuse distance) which fulfills the minimum link quality criteria. This is in contrast to reuse schemes in which channel selection is based on C/I measurements. In these other reuse schemes, the lower reuse plans (i.e., the reuse plans associated with the greatest reuse distances) are preferred because the channels associated with these plans offer the highest link quality. However, it also results in an increased call blocking rate and a decreased traffic-carrying capacity. As one skilled in the art will readily understand, the inventive techniques described herein will increase overall link quality and reduce call drop rate. It also reduces the blocking probability for mobile units that might otherwise function adequately under higher reuse plans (i.e., reuse plans that involve shorter reuse distances). However, a price is paid by mobile units that require a channel associated with one of the lower reuse levels because they may experience a higher blocking rate. The network can, of course, try to select a channel associated with a higher reuse plan for these mobile units, but in most cases it is unlikely that a channel with acceptable link quality will be found.

As the system is used over time, the number of the enhanced mobile units will most likely increase, while the number of non-enhanced mobile units will likely decrease. Similarly, the use of mobile units for transmitting and receiving information other than voice data is likely to increase. Consequently, system operators can reassign channels to proportionally allocate them to the fixed reuse plans that are most frequently utilized, thereby increasing the traffic-carrying capacity of the system.

In an alternative embodiment, the network will maintain a database to track the capabilities of each base station, and the availability of each channel associated with each base station and reuse plan. Therefore, when a mobile unit first places a call, the network may first determine both the service type and the mobile type. The network can then immediately establish the minimum required link quality and consult the database for a base station that not only has the capability to process the service request, but also is known to have an available channel that is associated with a preferred reuse plan. This alternative embodiment better assures that a preferred reuse plan will be utilized whenever possible, thus efficiently utilizing the traffic carrying capacity of the system.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular telecommunications system, a method of assigning a channel to a mobile call, said method comprising the steps of:
   determining a minimum link quality required for the mobile call;
   selecting a base station from a plurality of base stations as a function of said required minimum link quality, wherein each of said plurality of base stations corresponds to a different minimum link quality, and wherein said selected base station comprises receiver detection characteristics that enable the selected base station to operate at the minimum required link quality; and
   assigning a channel to the mobile call, wherein the channel is associated with the selected base station.

2. The method of claim 1, wherein said step of determining a minimum link quality is based on mobile unit receiver detection capabilities.

3. The method of claim 2, wherein the mobile unit receiver detection capabilities include receiver diversity.

4. The method of claim 2, wherein the mobile unit receiver detection capabilities include interference cancellation.

5. The method of claim 4, wherein the selected base station receiver detection characteristics include receiver diversity.

6. The method of claim 4, wherein the selected base station receiver detection characteristics include interference cancellation.

7. The method of claim 1, wherein said step of assigning a channel comprises the step of:
   identifying an available channel.

8. The method of claim 1, wherein said step of assigning a channel comprises the step of:
   randomly selecting an available channel.

9. The method of-claim 1, wherein said step of assigning a channel comprises the step of:
   selecting a least interfered available channel.

10. The method of claim 1, wherein said step of assigning a channel comprises the step of:
    selecting an available channel that exhibits a link quality that exceeds a predetermined threshold.

11. In a cellular telecommunications system, a method of assigning a channel to a mobile call, said method comprising the steps of:
    determining a minimum link quality required for the mobile call;
    selecting one of a plurality of base station transceivers associated with a base station, wherein each of the transceivers corresponds to a different fixed reuse plan, and wherein the selected one of said plurality of base station transceivers comprises receiver detection characteristics that enable the base station to operate at the minimum required link quality; and
    assigning a channel to the mobile call, wherein the channel is associated with the fixed reuse plan that corresponds with the selected transceiver.

12. The method of claim 11, wherein said step of determining a minimum link quality is based on mobile unit receiver detection capabilities.

13. The method of claim 12, wherein the mobile unit receiver detection capabilities include receiver diversity.

14. The method of claim 12, wherein the mobile unit receiver detection capabilities include interference cancellation.

15. The method of claim 11, wherein said step of selecting a base station transceiver depends on the transceiver's receiver detection characteristics.

16. The method of claim 15, wherein the base station transceiver's receiver detection characteristics include receiver diversity.

17. The method of claim 15, wherein the base station transceiver's receiver detection characteristics include interference cancellation.

18. The method of claim 11, wherein said step of assigning a channel comprises the step of:
    identifying an available channel.

19. The method of claim 18, wherein said step of assigning a channel comprises the step of:
    randomly selecting an available channel.

20. The method of claim 18, wherein said step of assigning a channel comprises the step of:
    selecting a least interfered available channel.

21. The method of claim 18, wherein said step of assigning a channel comprises the step of:
    selecting an available channel that exhibits a link quality that exceeds a predetermined threshold.

22. In a mobile telecommunications system, a method of assigning a channel to a mobile unit, said method comprising the steps of:
    determining a communication data service being requested by the mobile unit;
    selecting a base station that is capable of processing the requested communication data service;
    determining a mobile unit type;
    determining a minimum required link quality for the mobile unit;
    selecting one of a plurality of fixed reuse plans, wherein the selected reuse plan assures at least said minimum required link quality; and
    assigning one of a plurality of channels allocated to the base station, wherein said channel is associated with the selected fixed reuse plan.

23. The method of claim 22, wherein said step of determining a minimum required link quality depends upon the requested communication data service and the mobile unit type.

24. The method of claim 23, wherein the requested communication service is a low bit rate data service.

25. The method of claim 24, wherein the low bit rate data service includes forward error correction coding.

26. The method of claim 23, wherein the requested communication service is a high bit rate data service.

27. The method of claim 26, wherein the high bit rate data service includes forward error correction coding.

28. The method of claim 26, wherein the high bit rate data service includes multi-level modulation.

29. The method of claim 23, wherein said step of assigning a channel comprises the steps of:
   determining whether a channel associated with the selected fixed reuse plan that at least assures the minimum required link quality is available;
   if a channel is available, selecting a channel associated with the fixed reuse plan that at least assures the minimum required link quality; and
   if a channel is not available, selecting a channel associated with a next highest reuse plan which has an available channel and is capable of assuring the minimum required link quality.

30. The method of claim 29, wherein said step of selecting a channel associated with the fixed reuse plan if a channel is available comprises the step of:
   randomly selecting an available channel from a group of available channels.

31. The method of claim 29, wherein said step of selecting a channel associated with the fixed reuse plan if a channel is available comprises the step of:
   selecting a least interfered with available channel from a group of available channels.

32. The method of claim 29, wherein said step of selecting a channel associated with the fixed reuse plan if a channel is available comprises the step of:
   selecting an available channel that exhibits a link quality that exceeds a predetermined link quality threshold level.

33. In a mobile telecommunications system, a method of assigning a channel, associated with one of a number of different fixed reuse plans, to a mobile unit, said method comprising the steps of:
   determining a communication service being requested by the mobile unit;
   determining a mobile unit type;
   determining a minimum required link quality for the mobile unit based upon the requested communication service and the mobile unit type;
   selecting a base station that has the capability to support the requested communication service, and is known to have an available channel associated with a fixed reuse plan that at least assures the minimum required link quality; and
   assigning the available channel.

34. The method of claim 33, wherein the requested communication service is a low bit rate data service.

35. The method of claim 34, wherein the low bit rate data service includes forward error correction coding.

36. The method of claim 33, wherein the requested communication service is a high bit rate data service.

37. The method of claim 36, wherein the high bit rate data service includes forward error correction coding.

38. The method of claim 36, wherein the high bit rate data service includes multi-level modulation.

* * * * *